June 2, 1931.  D. A. CORCORAN  1,807,966
VISIBLE LIQUID DISPLAY DEVICE
Filed Dec. 16, 1929   2 Sheets-Sheet 1
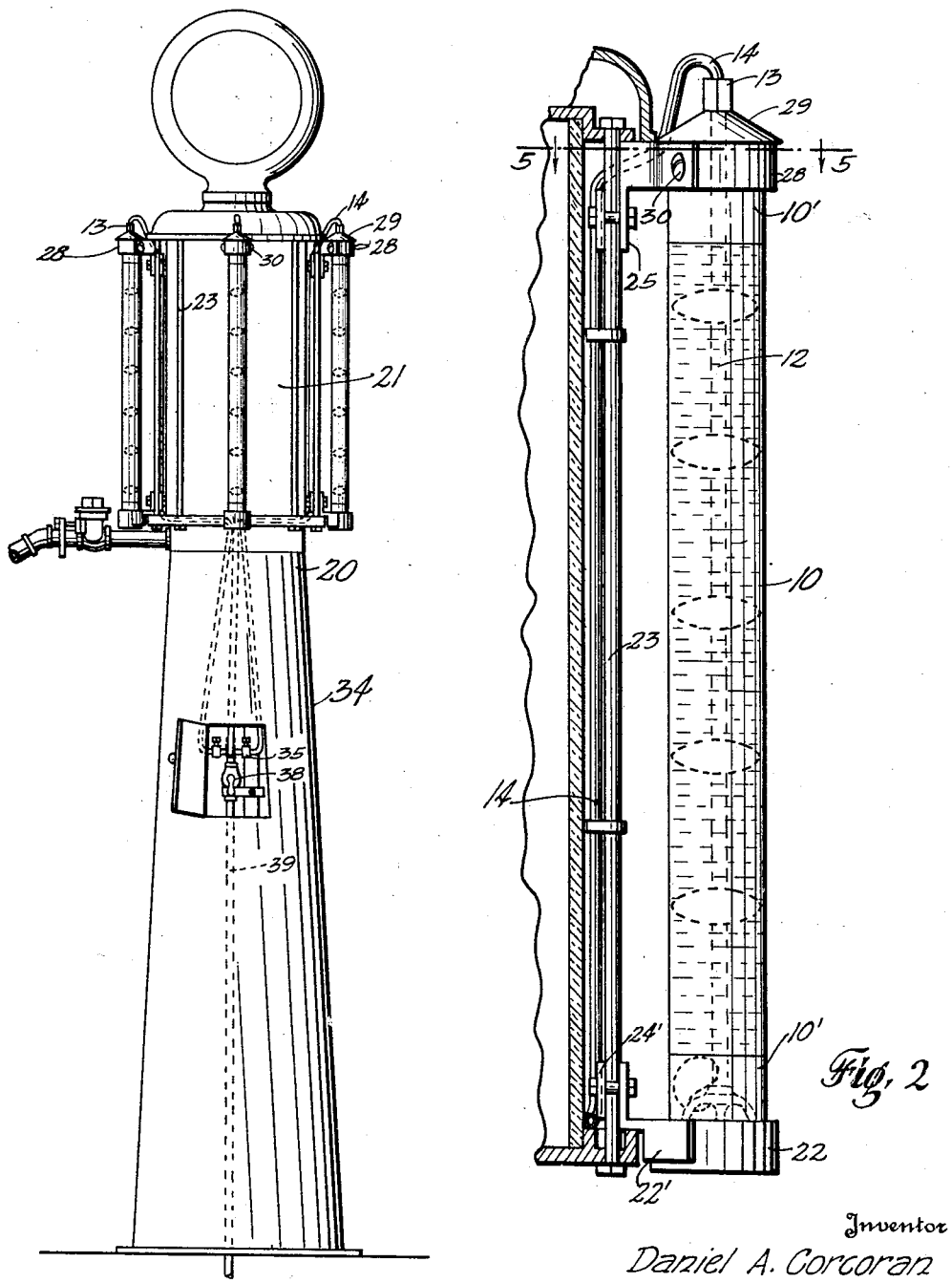
Inventor
Daniel A. Corcoran
By
Jack Atchley
Attorney June 2, 1931.  D. A. CORCORAN  1,807,966
VISIBLE LIQUID DISPLAY DEVICE
Filed Dec. 16, 1929   2 Sheets-Sheet 2

Inventor
Daniel A. Corcoran
By Jack Athley
Attorney

Patented June 2, 1931

1,807,966

UNITED STATES PATENT OFFICE

DANIEL A. CORCORAN, OF ARDMORE, OKLAHOMA, ASSIGNOR TO VISIBLE OIL MERCHANDISING CO., INC., OF DALLAS, TEXAS, A CORPORATION OF TEXAS

VISIBLE LIQUID DISPLAY DEVICE

Application filed December 16, 1929. Serial No. 414,364.

This invention relates to new and useful improvements in visible liquid display devices.

One object of the invention is to provide in connection with a suitable support, improved means for aerating a column of liquid, whereby an attractive and effective display is produced.

An important object of the invention is to provide improved means for causing enlarged air bubbles to pass upwardly through a column of liquid in spaced order in such a manner as to command and hold the attention of the observer.

A further object of the invention is to combine the display means with a liquid dispenser and to involve certain improvements and niceties of structure making for an advance in the art.

A construction designed to carry out the invention will be hereinafter described together with other features of the invention.

The invention will be more readily understood from a reading of the following specification and by reference to the accompanying drawings in which an example of the invention is shown, and wherein:

Figure 1 is an elevation of a liquid dispenser equipped with display devices constructed in accordance with the invention.

Figure 3:
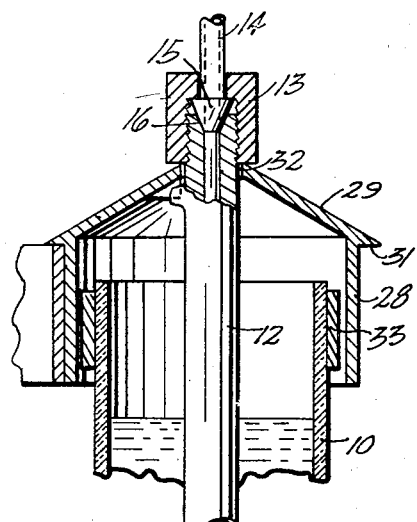
Figure 6:
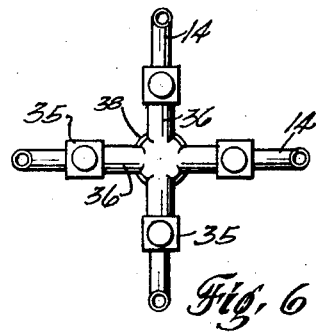
Figure 7:
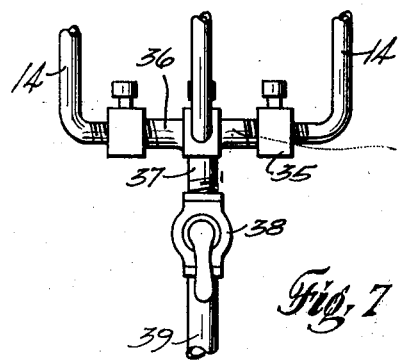
Figure 4:
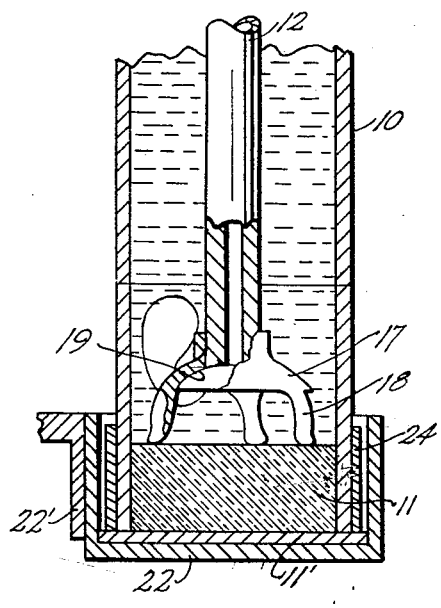
Figure 5:
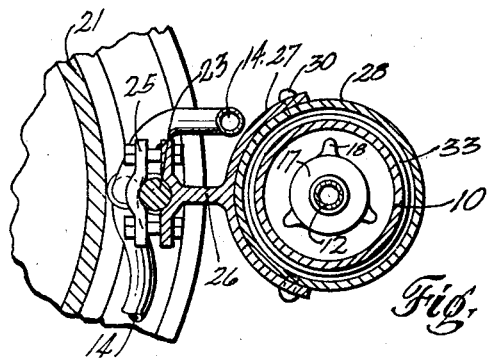

Figure 2 is an enlarged view, partly in elevation and partly in vertical section, showing one of the display elements and contiguous parts of its support, Figure 3 is an enlarged vertical sectional view of the upper end of one of the display elements, Figure 4 is a similar view of the lower end portion of the same part, Figure 5 is an enlarged horizontal cross-sectional view taken on the line 5—5 of Figure 2, and Figures 6 and 7 are details of the air manifold and connections.

In the drawings the numeral 10 designates a cylindrical container or tube which may be made of glass or other transparent or translucent material suitable for the purpose. The bottom of the tube is sealed by a plug 11 of cork or any other suitable material frictionally engaged therein so as to prevent leakage of a fluid contained in the tube. The tube is open at the upper end.

A small aerating pipe 12 is disposed longitudinally within the tube and has its upper end externally screw-threaded to receive a coupling nut 13. An air supply pipe 14 has a bevelled bushing 15 within the nut engaging in a bevelled seat 16 at the upper end of the pipe. By screwing the nut down onto the pipe the bushing is tightly seated, thus making an airtight joint. Compressed air, gas or any other pressure fluid supplied to the pipe 14 from a suitable source is discharged into the pipe 12.

A pedestal 17 is suitably secured on the lower end of the pipe 12 and is provided with supporting legs 18 resting upon the plug 11. This pedestal is formed with a concavo-convex bell 19. The compressed air from the pipe 12 is discharged under constant pressure into the bell 19. Said bell has sufficient area to collect such a quantity of air as to form a large bubble when it escapes under the lip of the bell into a suitable liquid placed in the tube 10.

As the air begins to flow under the lip of the bell the cohesion of the air, together with the pressure of the liquid contained in the tube, will force out the air remaining within the bell. This action will cause the bubbles to intermittently escape under the lip of the bell, as a period of time will elapse while the air is again collecting in the bell. The elapsed time or intermittent flow of the bubbles may be varied according to the air pressure in the pipe 12.

Very satisfactory results have been had by filling the tube 10 with lubricating oil, but the invention is not to be limited to such a commodity. Owing to the bell and its area the intermittently discharged air forms comparatively large bubbles and these pass upward through the oil in spaced order. Owing to the size of the bubbles and their periodic discharge, an obtrusive display is had. The bubbles are readily visible, even from a goodly distance, and take on an iridescence which is not only pleasing but attractive and ornamental.

The bubbles are sufficiently large as to assume a quadrant shape rather than spherical and thus increase their display qualities. It is pointed out that the tube is of such diameter and the bubbles are of such size that the latter curve circumferentially in a horizontal direction rather than being merely spheres having their under sides distorted. These bubbles may be substantially semicircular and thus enhance their display value.

Opaque bands 10' encircle the opposite ends of the tube 10 for concealing the bubble forming element and the liquid level, whereby only the liquid and the bubbles contained therein are displayed.

One or more of these display elements may be used and they may be mounted in any suitable place. I have illustrated an assembly in connection with an ordinary gasoline dispenser 20 in which a plurality of the tubes 10 are mounted around the display bowl 21 of the dispenser. In this particular mounting a socket cup 22 is suitably fastened, as by welding or otherwise, to a yoke of a bracket 22'. The band 21 is usually provided with upright connecting rods 23 to which the bracket is secured by a clamp 24', as shown in Figure 2. A guard ring 24 of felt or any other suitable material surrounds the lower end of the tube 10 and fits in the cup 22 so as to hold the tube in place and protect it from injury. A cushion 11' of cork or any other suitable material is provided between the tube 10 and the cup 22 as added protection to the tube against injury.

For supporting the upper end of the tube a bracket 26 is secured to the adjacent rod 23 by a clamp 25. This bracket is provided with a yoke 27 which is shaped to conform to and receive the cylindrical apron 28 of a cap 29. The apron is fastened in the yoke by screws 30 (Figure 5) and the yoke being less than a semi-circle, it is obvious that by removing the screws the cap may be readily detached from the bracket.

By provision of the clamps 24' and 25 the tubes 10 may be easily and conveniently installed on various makes of dispensers, but the invention is not to be limited to this type of clamps as any means suitable for the purpose may be used for securing the device to the dispensers.

The cap is provided with an overhanging flange 31 so as to drain rain, snow and the like from the top of the cap which is inclined. The pipe 12 passes up through an aperture 32 in the center of the cap. A guard ring 33 surrounds the upper end of the tube 10 within the apron 28, but does not completely fill the space between the tube and the apron so as to permit the air to escape from the top of the tube to the atmosphere. It is obvious that when the screws 30 are removed the cap, tube and pipe may be removed as a unit without disturbing the parts or liquid contained in said tube.

For supplying and controlling the compressed air or fluid the individual pipes 14 may be led down the outside of the bowl 21 and into the base 34 of the dispenser. I have illustrated four tubes 10 and therefore four pipes 14. Each pipe is connected with a needle valve 35, as is best shown in Figures 6 and 7 and the needle valves are mounted on the branches of a four-way spider 36. The spider has a central depending shank 37 screwed into a controlling valve 38 which is mounted on the upper end of a supply pipe 39. The pipe 39 may be connected with an air compressor, storage tank or any other source for supplying the fluid used.

Where the device is used for displaying lubricating oils or other liquids having different grades or specific gravities, each tube 10 may contain a different grade, such as "light", "medium", "heavy" and "extra heavy". By regulating the needle valves 35 and the controlling valve 38 the supply of air to the pipes 14 may be controlled and thus the frequency of the bubbles escaping from the bells 19 determined.

The valves can be adjusted so that the bubbles in the individual tubes rise in the same frequency or the bubbles in each tube may be caused to appear at different intervals from those in the other tubes. It is not believed necessary to go into all of the possibilities of this manipulation and variation. The essential feature of the invention is the large size air bubbles and their attractive qualities.

Various changes in the size and shape of the different parts, as well as modifications and alterations, may be made within the scope of the appended claims.

What I claim, is:

1. A display device comprising a tube of transparent material having liquid therein, an air supply pipe submerged in the liquid of the tube, a pedestal on the lower end of the pipe including a bell and supporting legs depending from the bell, the underside of the bell being truly concaved and of sufficient area to release a large sized bubble, and means for supplying compressed air to the pipe.

2. In a display device, a tube of transparent material having liquid therein, a plug sealing the lower end of the tube, an air supply pipe submerged in the liquid of the tube, a pedestal on the lower end of the pipe including a bubble forming bell and resting upon said plug, and means for detachably connecting the upper end of the submerged pipe with an air supply conductor.

3. The combination set forth in claim 2, with a support for the lower end of the tube, a cap overhanging the upper end of the tube and means for detachably fastening the cap to a rigid support.

4. The combination set forth in claim 2, with a support for the lower end of the tube, a cap overhanging the upper end of the tube and means for detachably fastening the cap to a rigid support, the cap and the upper end of the tube being so connected as to permit air to escape there-between.

5. In a display device, a tube of transparent material having liquid therein, said tube having its lower end sealed and its upper end open, a bubble forming and releasing element contained in the tube, said element having means for releasing a large sized bubble, means for supplying air to the bubble forming and releasing element, an element contained in the liquid for distorting the shape of the bubbles, a lower support for the tube, and a cap overhanging the tube detachably fastened to a rigid support, the tube being loosely mounted in its supports with an air escape between the cap and said tube.

6. In a display device, an upright tube of transparent material having liquid therein and closed at its lower end and open at its upper end, a support for the lower end of the tube, an element surrounding the upper open end of the tube, a cap mounted on said element, an air supply pipe penetrating the cap and extending downwardly into the tube, a bubble forming bell on the lower end of the tube, and means for supplying air to the upper end of the tube.

In testimony whereof I affix my signature.

DANIEL A. CORCORAN.